United States Patent [19]

Hubacher

[11] 3,849,872

[45] Nov. 26, 1974

[54] CONTACTING INTEGRATED CIRCUIT CHIP TERMINAL THROUGH THE WAFER KERF

[75] Inventor: Eric M. Hubacher, Wappingers Falls, N.Y.

[73] Assignee: International Business Machines Corporation, Armonk, N.Y.

[22] Filed: Oct. 24, 1972

[21] Appl. No.: 300,075

[52] U.S. Cl. ........................ 29/574, 29/583, 357/40, 357/48, 317/101, 324/158 T

[51] Int. Cl. ........................ H01l 19/00, H01l 7/66

[58] Field of Search ............ 317/235, 22, 22.1, 101; 29/577, 574; 324/158 T

[56] References Cited

UNITED STATES PATENTS

| | | | |
|---|---|---|---|
| 3,539,876 | 11/1970 | Feinberg et al. | 317/101 |
| 3,633,268 | 1/1972 | Engbert | 29/574 |
| 3,634,731 | 1/1972 | Skogmo | 317/101 |

*Primary Examiner*—Rudolph V. Rolinec
*Assistant Examiner*—E. Wojciechowicz
*Attorney, Agent, or Firm*—J. B. Kraft

[57] ABSTRACT

A test system for selectively accessing mechanically difficult to access terminals in an integrated circuit chip by the combination of an externally accessible circuit terminal formed in the wafer kerf, a conductive bus bar formed in the kerf connected to the terminal, connecting means for connecting each of a plurality of chip terminals to the conductive bus bar, means for connecting the kerf terminal to a tester, and means for selectively activating a connecting means between the chip terminal and bus bar to provide conductive signal paths from selected chip terminals to the kerf terminal.

5 Claims, 3 Drawing Figures

CONTACTING INTEGRATED CIRCUIT CHIP TERMINAL THROUGH THE WAFER KERF

RELATED PATENT APPLICATION

Patent application Ser. No. 268,407, H. F. Quinn, entitled "Externally Accessing Mechanically Difficult to Access Circuit Nodes in Integrated Circuits," filed July 3, 1972, and assigned to a common assignee, is related to the present application.

BACKGROUND OF INVENTION

The present invention relates to the testing of monolithic integrated circuits and, particularly, to structures for externally accessing integrated circuit terminals which are mechanically difficult to access.

Monolithic integrated circuits comprise a complete circuit on an integral unit or chip of semiconductor material. In general, the components or devices of the circuit are imbedded in and extend from a surface of the semiconductor substrate. A typical monolithic integrated circuit structure is described in U.S. Pat. No. 3,539,876.

The tests performed on monolithic integrated circuits may be broken into two general categories, functional testing for circuit characteristics and tests for device characteristics. In functional testing, the integrated circuits are tested in order to determine the capability of the integrated circuits to perform the basic function for which they were designed. The functional tests are designed relative to the intended application of the integrated circuit. Such tests include switching thresholds, saturation levels, the size of the load which the circuit is capable of driving, turn-on and turn-off times and noise immunity of the circuit.

At the present state of the art, such functional tests are usually performed directly on the integrated circuit chip by applying specific electrical input to specified pads or contact terminals on the chip and monitoring the electrical outputs in other pads or terminals in the chip. Because of the basic nature of functional testing, it is conventionally carried out after the completion of the device formation, dielectric isolation and metallization in chip fabrication. In addition, in large scale integrated circuits of relatively high device density, functional testing is most suitably carried out at the wafer level, i.e., before the wafer is diced into the individual integrated circuit chips.

The functional testing at the wafer level is conventionally carried out by contacting the chip terminals, usually arranged around the periphery of the chip, with an appropriate test head having an array of contacts or probes which respectively engage the chip terminals. The probes in the tester head respectively apply signals to some terminals and sense signals from other terminals. With the increasing complexity of large scale integration and the attendant densification of integrated circuits, the number of chip terminals has increased while the size of and the spacing between such chip terminals has decreased. As a result, means for making direct mechanical contact to chip terminals with tester heads are becoming increasingly difficult to implement.

Accordingly, there is a rising need in the testing art for structures and methods for connecting the chip terminals to the tester which avoids direct mechanical contact of the chip terminals by a tester probe head. This need may be expected to become even more significant as the density of devices in integrated circuits continues to increase in the direction of "computers on chips".

SUMMARY OF THE INVENTION

Accordingly, it is a primary object of the present invention to provide a testing system and integrated circuit structure which permits external access to the chip terminals for both signal application and signal sensing without making direct mechanical contact to such terminals.

It is an even further object of the present invention to provide an integrated circuit testing system with means for selectively externally accessing mechanically difficult to access chip terminal, which means may be disenabled during the operation of the integrated circuit.

It is yet another object of the present invention to provide an integrated circuit testing system wherein chip terminals may be tested at the wafer level without making direct mechanical contact to such terminals.

In accordance with the present invention, a monolithic integrated circuit wafer is provided with kerf circuitry for selectively accessing chip terminals. This accessing circuitry comprises at least one externally accessible circuit terminal formed in the kerf, preferably near the edge of the wafer, one or more conductive bus bars in the kerf connected to the kerf terminals, connecting means connecting each of a plurality of chip terminals, preferably in different chips, through the conductive bus bar, the connective path between the chip terminal and the bus bar being normally inactive, means for connecting the kerf terminal to a tester, and means for selectively activating the connecting means to provide conductive signal paths from selected chip terminals to the kerf terminal through the bus bars.

The conductive paths from the chip terminals through the connecting means are most suitably activated by selectively activating the chips containing said terminals, e.g., by supplying appropriate operational power levels to the chips.

In this manner, the necessity for directly contacting closely spaced chip terminals during testing is avoided. The terminals in the wafer kerf may be spaced as far from each other as necessary for convenient contact by a tester probe head.

The foregoing and other objects, features and advantages of the invention will be apparent from the following more particular description and preferred embodiments of the invention as illustrated in the accompanying drawings.

DESCRIPTION OF PREFERRED EMBODIMENTS

Figure 1:
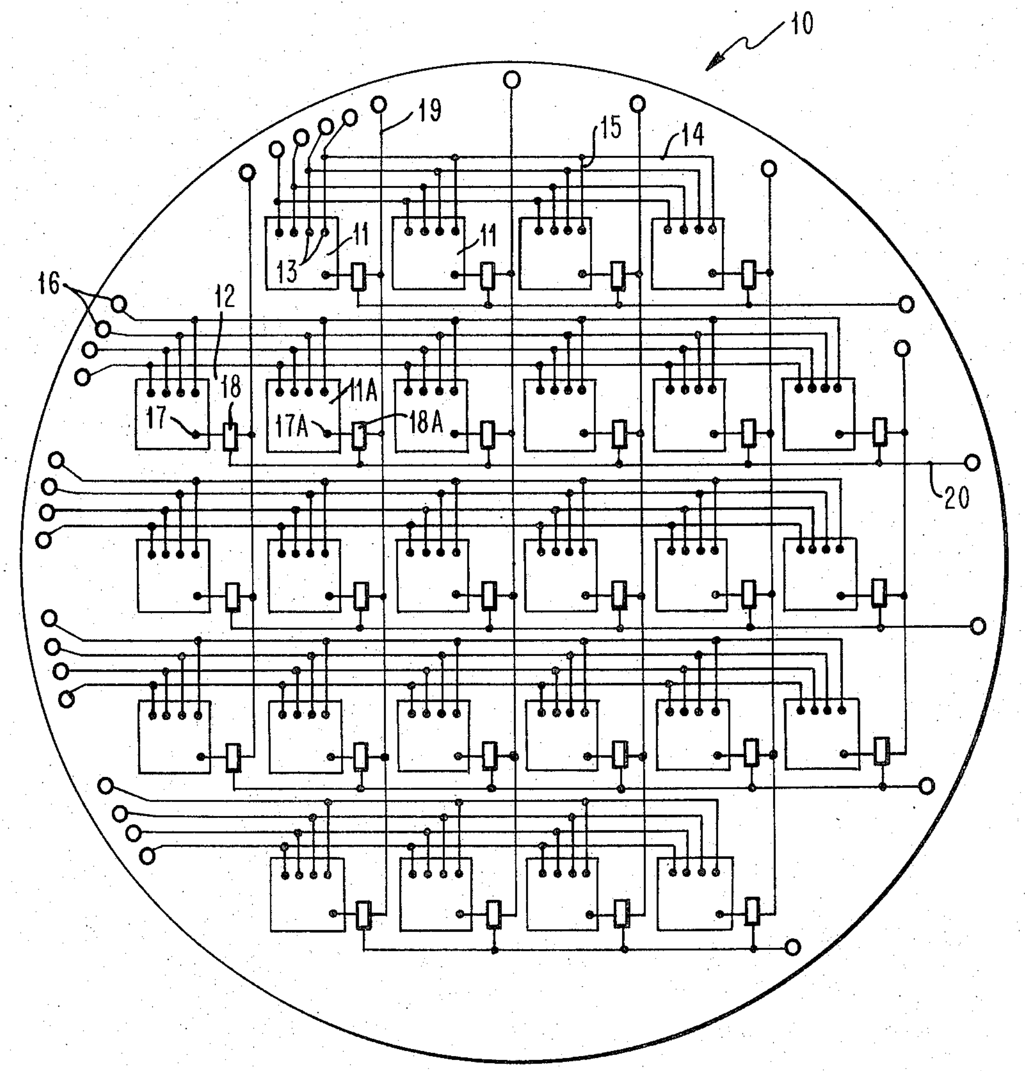
FIG. 1 is a diagrammatic top view of an integrated circuit wafer including the chips and kerf regions between the chips.

With reference to FIG. 1, the wafer 10 comprises a plurality of chips 11 separated by kerf regions 12. For purposes of clarity, the complete details of the wafer have not been shown and dimensions, particularly of the kerf region, have been exaggerated so that they are larger than the actual kerf dimensions. For the present illustration, the integrated circuits involved may be considered to have a basic structure corresponding to the structure of the integrated circuits described in U.S. Pat. No. 3,539,876, and the integrated circuits and metallization may be advantageously fabricated by utilizing the processes described in said patent or by presently known ion implantation techniques. Assuming that each of the chips in FIG. 1 has a plurality of chip terminals 13 spaced so close together that they cannot be mechanically accessed by conventional clusters for heads of test probes, the present embodiment provides for each row of chips a group of parallel conductive bus bars 14 in the kerfs between the rows. Each bus bar is connected to the same chip terminal in each of the chips in the row by conductive connectors 15. Each of the bus bars in a group is connected to a wafer terminal 16. The group of wafer terminals 16 associated with the bus bars for a particular row of chips is located at the periphery of the wafer and of sufficient size and spacing so that the wafer terminals may be easily mechanically contacted by standard test probe heads. The chips on the wafer are normally inactive. When the chip terminals on a particular chip are to be tested, the chip is activated, as will be hereinafter described. This, in turn, provides for each of chip terminals 13 in the activated chip a conductive path via corresponding connectors 15 and bus bars 14 to wafer terminals 16, each of which corresponds to a terminal 13 in the selected chip. The wafer terminals 16 may then be contacted in the conventional manner by test probes to perform whatever tests, involving input and output signals, are necessary. The means for connecting wafer terminals 16 to the tester, e.g., test probes, which are not shown, may be any suitable array of conventional test probes.

One suitable method for activating a particular chip in the array shown in FIG. 1 is to provide to the chip the power or voltage level necessary to render the chip operational. This may be conveniently done by selectively applying to a particular pin in the chip, i.e., pin 17, which is the pin to which a given voltage level is applied during chip operation to render the chip functional, a corresponding voltage level. This may be accomplished by having associated with each pin a gate 18 to which a pair of input signals must be applied to permit the gate to pass the desired voltage level to pin 17 in said chip. For example, suppose it is desired to activate chip 11A. A signal would then be applied along the Y selection metallization bar 19 and the X metallization selection bar 20. As a result, there would be a pair of input signals only at gate 18A associated with chip 11A. The requisite power level would then be applied to terminal 17A in said chip.

Figure 2:
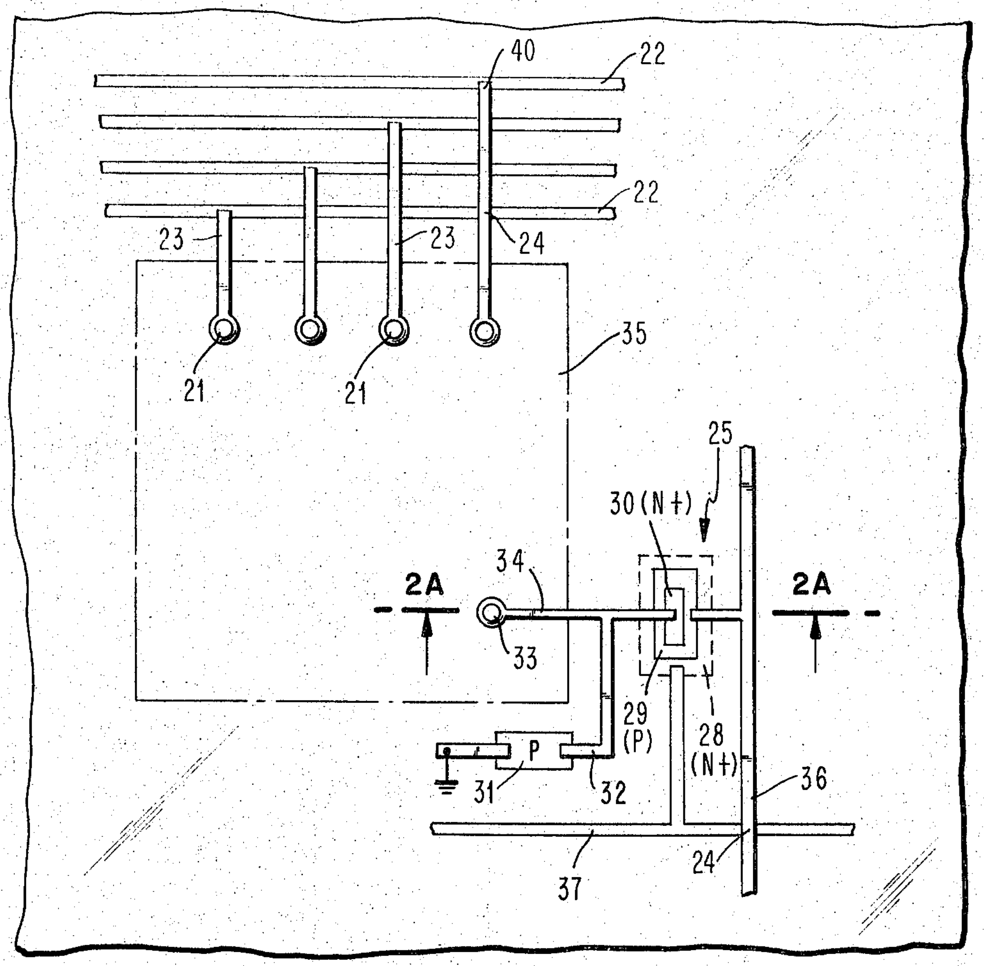
FIG. 2 is an enlarged, detailed, fragmentary top view of a single chip in the structure of FIG. 1, together with the surrounding kerf regions.
Figure 2A:
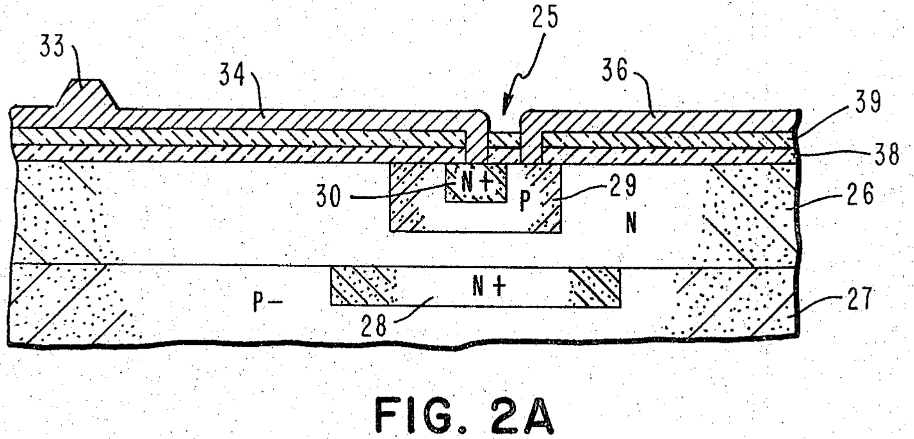
FIG. 2A is a cross-sectional view taken along line 2A—2A of FIG. 2.

For a more detailed view of the structure of one embodiment of the present invention, showing one convenient gating means, reference is made to FIGS. 2 and 2A.

As hereinabove stated, for purposes of the illustrative embodiment, we are utilizing an integrated circuit having a technology and structure similar to that described in U.S. Pat. No. 3,539,876. The kerf structure utilized in the circuitry for selectively activating particular chips in the wafer, as well as the metallization in the bus bars and lines for connecting the chip terminals to the accessible wafer terminals, also has the structure similar to the integrated circuit of U.S. Pat. No. 3,539,876. Accordingly, in the following description of said kerf structure, it will be understood that kerf circuitry having said specific structure is designed to cooperate with integrated circuit chips and wafers having a structure like that of said patent.

Chip terminals 21 are each respectively connected to a different bus bar 22 by a respective connector 23. The bus bars are, in turn, connected to peripheral wafer terminals which may be readily accessed as previously described. In the structure of FIG. 2, bus bars 22 are metallization formed on an insulative layer, such as silicon dioxide, covering the semiconductor substrate. Connectors 23 are likewise metallic. In order to provide for the cross-overs 24 of the structure in FIG. 2, a conventional two-layer metallurgy is required with, for example, bus bars 22 being formed on the first layer of silicon dioxide and connectors 23 on a second layer covering metallization of bus bars 22. Where contact is to be made between an interconnector and a bus bar at point 40, contact metal in a via hole through the second insulative layer under connectors 23 provides such contact.

Now, with reference to a suitable gating means for selectively activating a chip, transistor 25 is formed in N type epitaxial layer 26 supported on P- substrate 27. A buried subcollector region 28 is immediately under the transistor. The transistor also comprises base region 29 and emitter 30. NPN transistor 25 is formed in an emitter-follower circuit configuration with the emitter being connected to ground through diffused P type load resistor 31 and metallization path 32. Emitter 30 is also connected to chip terminal 33 through metallization 34 for applying a voltage level to chip 35 upon the application of a pair of input signals respectively to base 29 and to the transistor collector by means of Y bus input line 36 and X bus input line 37. In the structure of FIG. 2A, the two insulative layers are shown as 38 and 39, with bus line 36 being formed on the second layer 39 and bus line 37, which does not appear in section 2A, formed on insulative layer 38 to provide cross-overs between the X and Y lines. In order to select a particular transistor, a +V signal is applied to the collector of the transistor through X line 37 and a simultaneous signal is applied to the transistor base via Y line 36. This produces a higher voltage output on connector 34 which is sufficient, when applied to terminal 33, to selectively render chip 35 operative. While we have described a structure which utilized multilevel insulation and metallurgy for the requisite kerf cross-overs, the nature of achieving such cross-overs is, of course, not part of the present invention, and one level of bus bars or interconnectors could be suitably formed as a very low resistivity diffused region in the wafer kerf. In such a case, only one level of metallization would be needed to achieve the cross-overs.

In addition, any suitable expedient may be used to selectively connect the chip terminals which are substantially inaccessible to mechanical contacts to the peripheral wafer terminals which may be readily contacted because of their spacing. For example, the structure described in copending application Ser. No. 268,407, H. F. Quinn, filed June 30, 1972, utilizing photoconductive devices activated by light, may be used for the present purpose.

While the invention has been particularly shown and described with reference to preferred embodiments thereof, it will be understood by those skilled in the art that the foregoing and other changes in form and details may be made therin without departing from the spirit and scope of the invention.

What is claimed is:

1. In the testing of a monolithic integrated semiconductor circuit structure wherein each of a plurality of integrated circuits are formed on one of a plurality of chips on a wafer, said chips being separated by a wafer kerf, a method for externally accessing mechanically difficult to access chip terminals by a tester comprising forming in said kerf, a test circuit comprising at least one externally accessible circuit terminal, at least one conductive bus bar connected to said at least one kerf terminal, and connecting means for connecting each of a plurality of chip terminals on a plurality of chips to said conductive bus bar, said connecting means being normally inactive, connecting a tester to said kerf terminal, selectively activating said connecting means to provide conductive signal paths from selected chip terminals to said kerf terminal, and dicing the wafer into the discrete chips by removing the kerf.

2. The testing method of claim 1 wherein said connecting means are selectively activated by selectively activating the chips on which the selected terminals are located.

3. The method of claim 2 wherein said chips are arranged in an array of rows and columns, and said connecting means include a plurality of gating circuits formed in said kerf, each of which circuits is associated with a respective one of said chips and is adapted to activate said associated chip upon the application of a pair of signals to said gating circuit, a plurality of gate input connectors formed in said kerf, each of which is respectively connected to all of the gating circuits associated with a row or column of chips, and said selective activation is carried out by means for selectively applying a first signal to the input connectors for gating circuits associated with a selected row of chips and for selectively applying a second signal to the input connections for gating circuits associated with a selected column of chips whereby one gating circuit associated with the chip to be selectively activated will have the requisite pair of signals applied thereto.

4. The method of claim 2 wherein said test circuit comprises a plurality of kerf terminals and a corresponding plurality of conductive bus bars connected thereto, said bus bars being metal.

5. The method of claim 2 wherein said test circuit comprises a plurality of kerf terminals and a corresponding plurality of conductive bus bars connected thereto, said bus bars being low conductivity diffused semiconductor regions formed in said kerf.

* * * * *